United States Patent
Sakamoto et al.

(10) Patent No.: US 7,136,116 B2
(45) Date of Patent: Nov. 14, 2006

(54) LIQUID CRYSTAL DISPLAY WITH CONTROL ELECTRODES FOR PREVENTING LATERAL LEAK OF ELECTRIC FIELD

(75) Inventors: Michiaki Sakamoto, Minato-Ku (JP);
Masanobu Hidehira, Minato-Ku (JP);
Mamoru Okamoto, Minato-Ku (JP)

(73) Assignees: NEC Corporation, Tokyo (JP); NEC LCD Technologies Ltd., Kanagawa (JP)

( * ) Notice: Subject to any disclaimer, the term of this patent is extended or adjusted under 35 U.S.C. 154(b) by 0 days.

(21) Appl. No.: 10/084,355

(22) Filed: Feb. 28, 2002

(65) Prior Publication Data
US 2002/0118331 A1 Aug. 29, 2002

(30) Foreign Application Priority Data
Feb. 28, 2001 (JP) ............................ 2001-055191

(51) Int. Cl.
*G02F 1/136* (2006.01)
*G02F 1/1343* (2006.01)

(52) U.S. Cl. .................... 349/43; 349/139; 349/143
(58) Field of Classification Search ............... 349/143, 349/141, 139, 43, 138, 129, 38, 39
See application file for complete search history.

(56) References Cited

U.S. PATENT DOCUMENTS 5,682,211 A * 10/1997 Yao et al. ..................... 349/38
5,946,065 A * 8/1999 Tagusa et al. ............... 349/138
5,986,724 A * 11/1999 Akiyama et al. ............. 349/41
6,219,118 B1 4/2001 Zhang ......................... 349/110
6,445,435 B1 * 9/2002 Seo et al. .................... 349/141

FOREIGN PATENT DOCUMENTS

| JP | 4-319920 | 11/1992 |
| JP | 5-273584 | 10/1993 |
| JP | 09-152625 | 6/1997 |
| JP | 10-78593 | 3/1998 |
| JP | 10-221715 | 8/1998 |
| JP | 11-109417 | 4/1999 |
| JP | 2001-215529 | 8/2001 |

* cited by examiner

Primary Examiner—James A. Dudek
(74) Attorney, Agent, or Firm—Young & Thompson

(57) ABSTRACT

A liquid crystal display (LCD) comprises a plurality of gate lines, a plurality of data lines, and switching elements each disposed in the proximity of one of intersections between the plurality of gate lines and the plurality of data lines. The LCD further comprises a plurality of pixel electrodes disposed over the gate lines and the data lines via an interlayer insulating film, wherein, when viewed from upside, that is, from the side of a gap between adjacent pixel electrodes toward the side of the gate line, the gap between adjacent pixel electrodes at least partially overlaps with the gate line, and a plurality of control electrodes each disposed under the gap between adjacent pixel electrodes and over the gate line, wherein, when viewed from upside, the control electrode covers the gate line.

22 Claims, 8 Drawing Sheets

PRIOR ART

PRIOR ART

LIQUID CRYSTAL DISPLAY WITH CONTROL ELECTRODES FOR PREVENTING LATERAL LEAK OF ELECTRIC FIELD

FIELD OF THE INVENTION

The present invention relates generally to a liquid crystal display used, for example, in a display of a computer and the like. More particularly, the present invention relates to a liquid crystal display which has switching elements each comprising a thin film transistor (TFT) and in which lateral leak of electric field caused by the potential difference between gate lines and pixel electrodes can be effectively prevented.

BACKGROUND OF THE INVENTION

As an example of a conventional liquid crystal display, FIG. 9 and FIG. 10 illustrate a liquid crystal display described in Japanese patent laid-open publication No. 10-221715. FIG. 9 is a plan view showing a portion of an active matrix substrate in such liquid crystal display. FIG. 10 is a cross sectional view taken along the line A—A of FIG. 9.

As shown in FIG. 10, an active matrix substrate 50 comprises an insulating substrate 51 made, for example, of glass and the like, a gate insulating film 52 formed on the insulating substrate 51, a passivation film 53 formed on the gate insulating film 52, an interlayer insulating film 54 formed on the passivation film 53, and pixel electrodes 55 which are formed in a matrix on the interlayer insulating film 54.

Also, as shown in FIG. 9, gate lines 56 and data lines 57 are disposed on the periphery of each of the pixel electrode 55. The gate lines 56 and the data lines 57 are perpendicular to each other, and surround each of the pixel electrodes 55. As shown in FIG. 10, each of the gate lines 56 is formed on the insulating substrate 51, and each of the data lines 57 (not shown in FIG. 10) is formed on the gate insulating film 52.

As shown in FIG. 9, a thin film transistor (TFT) 58 as a switching element is disposed in the proximity of each of the intersections between the gate lines 56 and the data lines 57. The thin film transistor 58 is electrically coupled to the pixel electrode 55 via a contact hole 59 which is formed in the interlayer insulating film 54.

A gate electrode of the thin film transistor 58 is coupled with the gate line 56, and the thin film transistor 58 is driven and controlled by a signal applied to the gate electrode via the gate line 56. Also, a drain electrode of the thin film transistor 58 is coupled with the data line 57, and a data signal is inputted to the drain electrode via the data line 57.

Further, as shown in FIG. 10, a control electrode 60 is formed on the interlayer insulating film 54, between adjacent pixel electrodes 55 and over the gate line 56. The control electrode 60 is formed in the same layer as that of the pixel electrodes 55.

FIG. 10 also shows an opposing substrate 64 which opposes to the active matrix substrate 50. The opposing substrate 64 comprises an insulating substrate 61, a color filter 62 formed on the insulating substrate 61, and an opposing electrode 63 formed on the color filter 62. The opposing substrate 64 is disposed such that the opposing electrode 63 and the pixel electrodes 55 oppose to each other.

On each of the opposing surfaces of the active matrix substrate 50 and the opposing substrate 64, there is disposed an alignment layer (not shown in the drawing). Also, there is provided a liquid crystal layer 65 which is held between the alignment layers on the active matrix substrate 50 and on the opposing substrate 64. Also, spacers (not shown in the drawing) are disposed between the active matrix substrate 50 and the opposing substrate 64 to keep a predetermined thickness of the liquid crystal layer 65. Further, there is formed a seal (not shown in the drawing) around the liquid crystal layer 65 for preventing liquid crystal molecules from leaking outside.

In the conventional liquid crystal display mentioned above, the control electrode 60 is disposed between adjacent pixel electrodes 55. The control electrode 60 is provided to avoid occurrence of so-called reverse tilt. The reverse tilt occurs when an electric field caused by the potential difference between the gate line 56 and the pixel electrodes 55 intrudes into the liquid crystal layer 65, and alignment direction of liquid crystal molecules partly differs from a predetermined direction.

However, in a manufacturing technology of liquid crystal display, it is considerably difficult to form the control electrodes 60 in the same layer as that of the pixel electrodes 55.

Also, as shown in FIG. 10, the space between mutually adjacent pixel electrodes 55 is not large and, therefore, the width of the control electrode 60 can not be so large. Further, when the control electrode 60 is to be formed in such narrow space between adjacent pixel electrodes 55, there is a high possibility that the control electrode 60 contacts one or both of the adjacent pixel electrodes 55.

In addition, it is necessary to provide some gaps 67 between the control electrode 60 and the pixel electrodes 55, in order to physically separate between the control electrode 60 and the pixel electrodes 55. When such gaps 67 are provided between the control electrode 60 and the pixel electrodes 55, the electric field produced by the potential difference between the gate line 56 and the pixel electrodes 55 is not shielded completely by the control electrode 60. Therefore, such electric field passes through the gaps 67, and extends horizontally along the pixel electrodes 55 into the liquid crystal layer 65. In this way, there is a possibility that so-called lateral leak of electric field designated by a reference numeral 68 is produced.

Such lateral leak of electric field 68 causes reverse tilt of liquid crystal molecules in the liquid crystal layer 65, and as a result causes disclination.

SUMMARY OF THE INVENTION

Therefore, it is an object of the present invention to provide a liquid crystal display in which occurrence of the above-mentioned lateral leak of electric field can be completely prevented.

It is another object of the present invention to provide a liquid crystal display in which occurrence of the above-mentioned lateral leak of electric field can be completely prevented without disposing a control electrode in each of narrow spaces between adjacent pixel electrodes.

It is still another object of the present invention to provide a liquid crystal display in which occurrence of the above-mentioned lateral leak of electric field can be completely prevented and which can be manufactured easily without causing difficulty in a manufacturing technology.

It is still another object of the present invention to provide a liquid crystal display in which occurrence of the above-mentioned lateral leak of electric field can be completely prevented and which can be manufactured with high productivity.

It is still another object of the present invention to provide a liquid crystal display in which occurrence of the above-mentioned lateral leak of electric field can be completely prevented and in which storage capacity of the liquid crystal display can be enlarged.

It is still another object of the present invention to obviate the disadvantages of the conventional liquid crystal display which has control electrodes for reducing the lateral electric field.

According to an aspect of the present invention, there is provided a liquid crystal display comprising: a plurality of gate lines disposed parallel to each other; a plurality of data lines disposed parallel to each other and perpendicularly to the plurality of gate lines; switching elements each disposed in the proximity of one of intersections between the plurality of gate lines and the plurality of data lines; a plurality of pixel electrodes disposed over the gate lines and the data lines via an interlayer insulating film, wherein, when viewed from upside, that is, from the side of a gap between adjacent pixel electrodes toward the side of the gate line, the gap between adjacent pixel electrodes at least partially overlaps with the gate line; and a plurality of control electrodes each disposed under the gap between adjacent pixel electrodes and over the gate line, wherein, when viewed from upside through the gap, the control electrode covers the gate line.

In above-mentioned liquid crystal display according to the present invention, when viewed from the gap between the adjacent pixel electrodes, the gate line is wholly covered by the control electrode. Therefore, the electric field produced by the potential difference between the gate line and the pixel electrodes is completely shielded by the control electrode. That is, a phenomenon in which the electric field leaks through the gap between the pixel electrodes and extends laterally along the pixel electrodes into the liquid crystal layer, i.e., the so-called lateral leak of electric field, can be effectively avoided.

In this case, it is preferable that, when viewed from upside, the control electrode at least overlaps with the gap between adjacent pixel electrodes in width direction.

By covering, when viewed from upside, not only the gate line but also the gap between the pixel electrodes by the control electrode, it is possible to completely prevent the electric field from passing through the gap between the pixel electrodes. Therefore, Therefore, the electric field produced by the potential difference between the gate line and the pixel electrodes is completely shielded by the control electrode. That is, a phenomenon in which the electric field leaks through the gap between the pixel electrodes and extends laterally along the pixel electrodes into the liquid crystal layer, i.e., the so-called lateral leak of electric field, can be completely avoided.

It is also preferable that, when viewed from upside, the control electrode at least overlaps with an area in which the gate line and the gap between adjacent pixel electrodes overlap.

It is not always necessary to completely cover any one or both of the gap between the pixel electrodes and the gate line by the control electrode. By covering at least any one of the gap and the gate line by the control electrode at least in an area in which the gap and the gate line overlaps, it is possible to prevent the above-mentioned lateral leak of electric field.

It is further preferable that, when viewed from upside, the control electrode overlaps with the gate line and with the gap between adjacent pixel electrodes.

It is advantageous that; the control electrode has the same potential voltage as that of a source electrode of the switching element.

It is also advantageous that the control electrode is formed in the same layer as that of a source electrode of the switching element.

The control electrode and the source electrode may be formed on mutually different layers. However, by forming the control electrode and the source electrode on the same layer, it is possible to form the control electrode and the source electrode in the same manufacturing process and to simplify the manufacturing process, so that productivity of the liquid crystal display can be improved.

It is further advantageous that the control electrode is formed integrally with a source electrode of the switching element.

The control electrode and the source electrode may be formed as separate pieces. However, by forming the control electrode and the source electrode integrally, it is possible to form the control electrode and the source electrode in the same manufacturing process and to simplify the manufacturing process, so that productivity of the liquid crystal display can be improved.

It is preferable that the control electrode has a single layer structure comprising metal or ITO.

It is also preferable that the control electrode has a multi-layer structure, each layer thereof comprising metal or ITO.

It is further preferable that the interlayer insulating film comprises an organic film.

It is advantageous that the liquid crystal display has a COT structure.

It is also advantageous that the liquid crystal display is a reflection type liquid crystal display.

It is further advantageous that the control electrode and a source electrode of the switching element are coupled via an extended portion of the source electrode, and a contact hole for coupling the control electrode and the pixel electrode is provided on the extended portion.

It is advantageous that a contact hole for coupling the control electrode and the pixel electrode is provided on the control electrode.

By forming the contact hole on the control electrode, it is possible to improve an aperture ratio by the amount corresponding to the area of the contact hole, when compared with the case the contact hole is formed on the extended portion.

According to another aspect of the present invention, there is provided an electronic equipment which includes the above-mentioned liquid crystal display, in a display portion of the electronic equipment.

According to still another aspect of the present invention, there is provided a liquid crystal display comprising: an active matrix substrate; an opposing substrate which is opposed to the active matrix substrate; and a liquid crystal layer interposed between the active matrix substrate and the opposing substrate; wherein the active matrix substrate comprises: a plurality of gate lines which are disposed on an insulating substrate and which are disposed parallel to each other; a plurality of data lines which are disposed on the plurality of gate lines via a gate insulating film and which are disposed parallel to each other and perpendicularly to the plurality of gate lines; switching elements each disposed in the proximity of one of intersections between the plurality of gate lines and the plurality of data lines; a plurality of pixel electrodes disposed over the gate lines and the data lines via an interlayer insulating film, wherein, when viewed from upside, that is, from the side of a gap between adjacent pixel electrodes toward the side of the gate line, the gap between adjacent pixel electrodes at least partially overlaps with the gate line; and a plurality of control electrodes each disposed under the gap between adjacent pixel electrodes and over the gate line, wherein, when viewed from upside, the control electrode covers the gate line.

In this case, it is preferable that the control electrode is formed integrally with a source electrode of the switching element.

It is also preferable that the control electrode and a source electrode of the switching element are coupled via an extended portion of the source electrode, and a contact hole for coupling the control electrode and the pixel electrode is provided on the extended portion.

It is further preferable that a contact hole for coupling the control electrode and the pixel electrode is provided on the control electrode.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the drawings, an explanation will be made on embodiments of the present invention.

Figure 1:
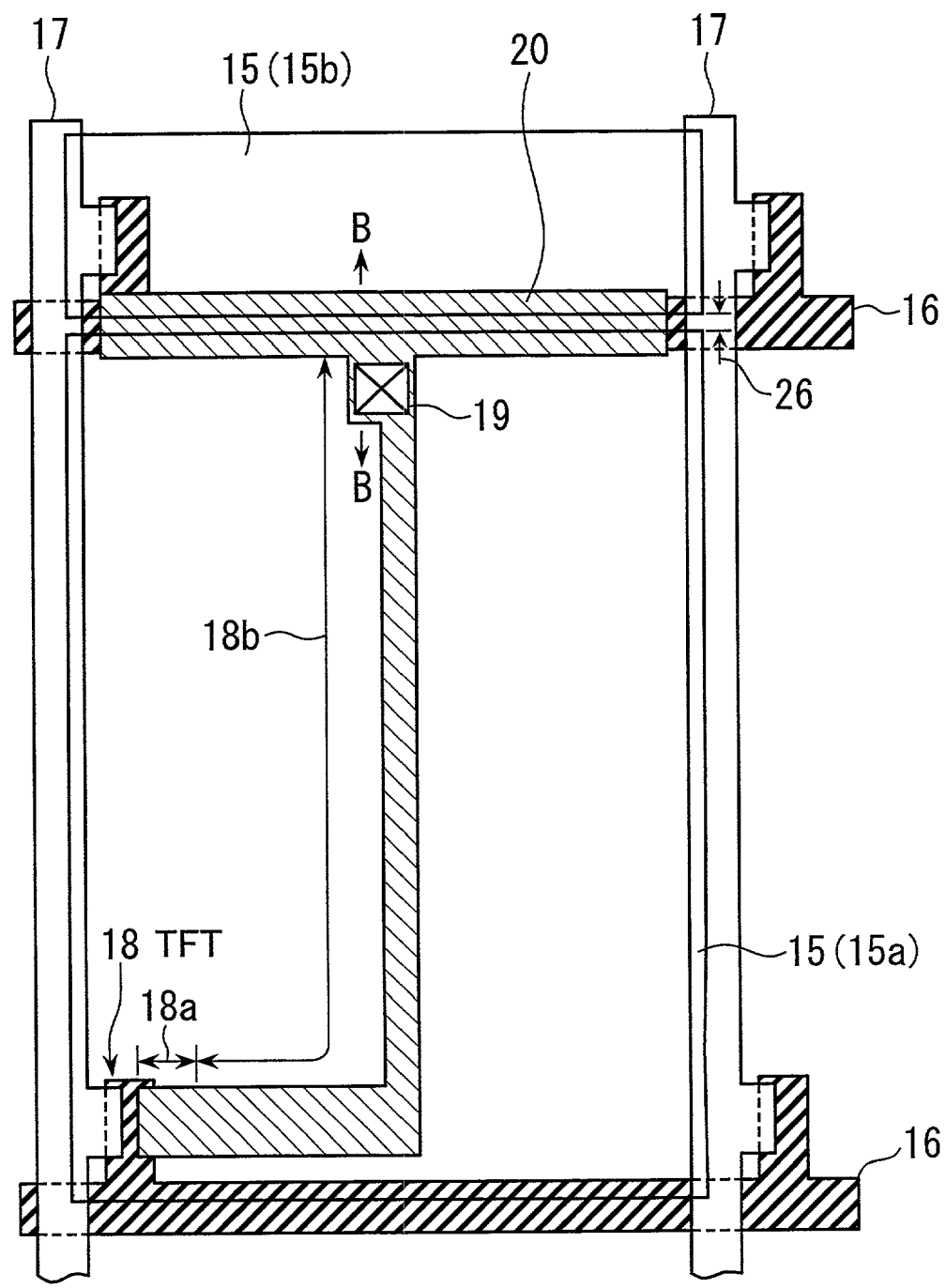
FIG. 1 is a plan view showing a portion of an active matrix substrate in a liquid crystal display according to a first embodiment of the present invention.
Figure 2:
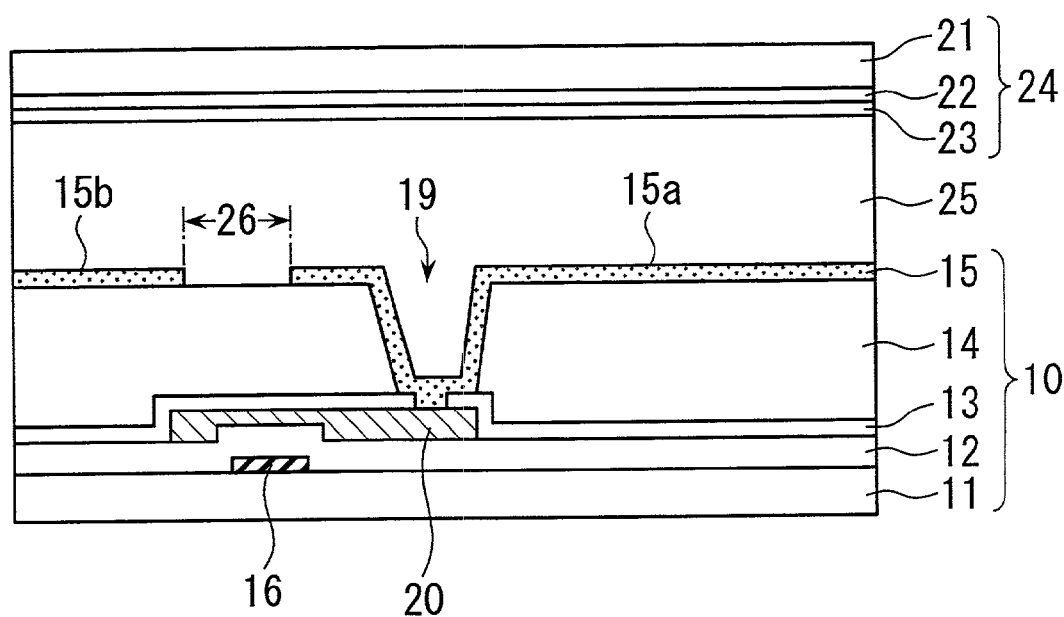
FIG. 2 is a partial cross sectional view taken along the line B—B of FIG. 1.

A liquid crystal display according to a first embodiment of the present invention is shown in FIG. 1 and FIG. 2. FIG. 1 is a plan view showing a portion of an active matrix substrate in the liquid crystal display according to the first embodiment of the present invention. FIG. 2 is a partial cross sectional view taken along the line B—B of FIG. 1.

As shown in FIG. 2, an active matrix substrate 10 comprises an insulating substrate 11 made, for example, of glass and the like, a gate insulating film 12 formed on the insulating substrate 11, a control electrode 20 formed on the gate insulating film 12, a passivation film 13 which is formed on the gate insulating film 12 and which covers the control electrode 20, an interlayer insulating film 14 formed on the passivation film 13, and pixel electrodes 15 which are formed in a matrix on the interlayer insulating film 14.

Also, as shown in FIG. 1, gate lines 16 and data lines 17 are disposed on the periphery of each of the pixel electrodes 15. The gate lines 16 and the data lines 17 are perpendicular to each other, and surround each of the pixel electrodes 15. As shown in FIG. 2, the gate line 16 is formed on the insulating substrate 11, and the data line 17 (not shown in FIG. 2) is formed on the gate insulating film 12.

As shown in FIG. 1, a thin film transistor (TFT) 18 as a switching element is disposed in the proximity of each of the intersections between the gate lines 16 and the data lines 17. The thin film transistor 18 is electrically coupled to the pixel electrode 15 via a contact hole 19 which is formed in the interlayer insulating film 14 and which is explained in detail later.

A gate electrode of the thin film transistor 18 is coupled with the gate line 16, and the thin film transistor 18 is driven and controlled by a signal applied to the gate electrode via the gate line 16. Also, a drain electrode of the thin film transistor 18 is coupled with the data line 17, and a data signal is inputted to the drain electrode via the data line 17.

Further, as shown in FIG. 2, there is disposed an opposing substrate 24 which opposes to the active matrix substrate 10. The opposing substrate 24 comprises an insulating substrate 21, a color filter 22 formed on the insulating substrate 21, and an opposing electrode 23 formed on the color filter 22. The opposing substrate 24 is disposed such that the opposing electrode 23 and the pixel electrodes 15 oppose to each other.

On each of the opposing surfaces of the active matrix substrate 10 and the opposing substrate 24, there is disposed an alignment layer (not shown in the drawing). Also, there is provided a liquid crystal layer 25 which is held between the alignment layers on the active matrix substrate 10 and on the opposing substrate 24. Also, spacers (not shown in the drawing) are disposed between the active matrix substrate 10 and the opposing substrate 24 to keep a predetermined thickness of the liquid crystal layer 25. Further, there is formed a seal (not shown in the drawing) around the liquid crystal layer 25 for preventing liquid crystal molecules from leaking outside.

In case the liquid crystal display is a transmission type liquid crystal display, each pixel electrode 15 comprises a transparent conductive film such as indium tin oxide (ITO) film and the like. In case the liquid crystal display is a reflection type liquid crystal display, each pixel electrode 15 comprises a metal film such as aluminum film and the like.

The gate lines 16 and the data lines 17 are made, for example, of metal such as aluminum, titanium and the like.

Each of the control electrodes 20 is formed, for example, as a single layer structure made of metal such as chromium, molybdenum, titanium or the like.

The interlayer insulating film 14 in this embodiment is an organic film, and comprises a photosensitive acrylic resin. The photosensitive acrylic resin has a relative dielectric constant in a range approximately from 3.4 to 3.5. The relative dielectric constant of the photosensitive acrylic resin is very low when compared with that of an inorganic film. For example, a relative dielectric constant of a silicon nitride is approximately 8. Also, the photosensitive acrylic resin has high transparency, and can be easily applied by spin coating to form a relatively thick thin film. Therefore, it is possible to easily lower the capacitance between the gate lines 16 and the pixel electrodes 15 and the capacitance between the data lines 17 and the pixel electrodes 15. As a result, it becomes possible to mitigate an influence of the cross talk on display operation caused by the capacitance component between the gate lines 16 and the pixel electrodes 15 and the capacitance component between the data lines 17 and the pixel electrodes 15.

By using the photosensitive acrylic resin, it is possible to easily form a relatively thick thin film having a thickness of several microns or so, for example, by spin coating. Also, when patterning the photosensitive acrylic film, a photolithography process is not required and, therefore, productivity of the liquid crystal display can be improved.

As shown in FIG. 2, in the liquid crystal display according to the present embodiment, when viewed from upside, there is formed a gap 26 between adjacent pixel electrodes 15a and 15b, and the gate line 16 is disposed under the gap 26 such that the gate line 16 overlaps with the gap 26.

Also, in the liquid crystal display according to the present embodiment, the control electrode 20, which is formed on the gate insulating film 12, wholly covers the gate line 16 and also wholly covers the gap 26, when viewed from upside of FIG. 2.

As shown in FIG. 1, the source electrode 18a of the thin film transistor 18 has an extended portion 18b which traverses the pixel electrode 15a and which extends to the control electrode 20. Therefore, the control electrode 20 is integrally formed with the source electrode 18a via the extended portion 18b.

In the extended portion 18b, there is formed a contact hole 19 in the proximity of the control electrode 20. Via the contact hole 19, the pixel electrode 15a is coupled with the control electrode 20 and, therefore, with the source electrode 18a of the thin film transistor 18.

It should be noted that the above-mentioned liquid crystal display according to the first embodiment can be driven by any of the driving methods such as a data line potential inverting method, a gate line potential inverting method, and a dot potential inverting method.

Here, the data line potential inverting method is a driving method in which polarity of a signal voltage of each pixel electrode is inverted every data line to which the pixel electrode is coupled. Also, the gate line potential inverting method is a driving method in which polarity of a signal voltage of each pixel electrode is inverted every gate line to which the pixel electrode is coupled. The dot potential inverting method is a driving method in which polarities of signal voltages of mutually adjacent pixels differ from each other.

As mentioned above, in the liquid crystal display according to the present embodiment, the control electrode 20 is formed such that it wholly covers both the gate line 16 and the gap 26 between adjacent pixel electrodes. Therefore, the electric field produced by the potential difference between the gate line 16 and the pixel electrodes 15 is completely shielded by the control electrode 20. That is, a phenomenon in which the electric field leaks through the gap 26 and extends laterally along the pixel electrodes 15 into the liquid crystal layer 25, i.e., the so-called lateral leak of electric field, can be effectively avoided.

Also, since the pixel electrode 15a and the control electrode 20 are coupled with each other via the contact hole 19, an auxiliary capacitance is formed between the control electrode 20 and the gate line 16 via the gate insulating film 12 interposed therebetween. Therefore, according to the structure of the present invention, it is possible to increase the storage capacitance of the liquid crystal display.

The structure of the liquid crystal display according to the present embodiment is not limited to the above-mentioned structure, but can be modified into various structures as mentioned below.

For example, in the liquid crystal display according to the present embodiment, when viewed from the side of the opposing substrate, i.e., from upside, the control electrode 20 is formed such that the control electrode 20 completely overlaps with the gate line 16 and the gap 26 between the pixel electrodes 15a and 15b, as shown in FIG. 2. However, the structure of the control electrode 20 is not limited to such structure.

Figure 3:
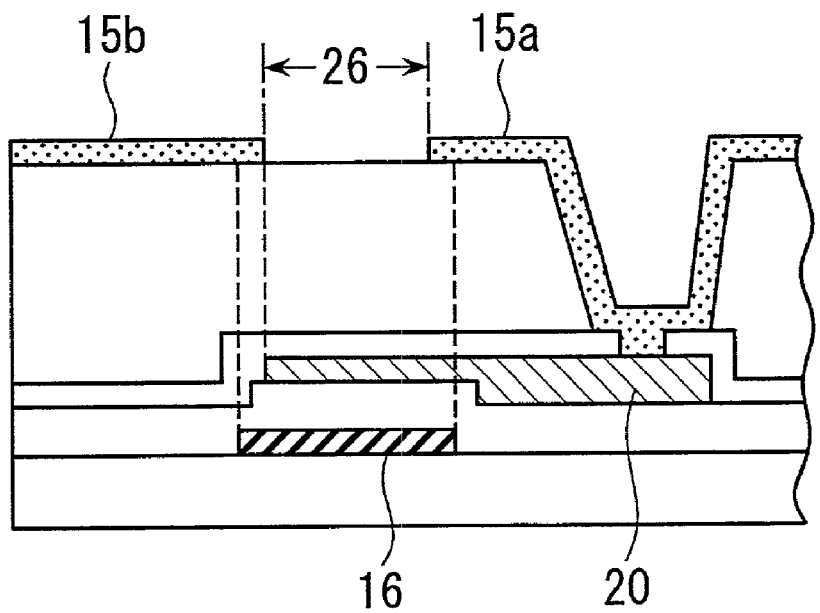
FIG. 3 is a partial cross sectional view showing a first example of a locational relationship among a gate line, a gap between pixel electrodes and a control electrode.

First, as shown in FIG. 3, the width of the gate line 16 may be larger than the width of the gap 26, and, when viewed from upside, the gap 26 may be wholly contained in the gate line 16.

Figure 10:
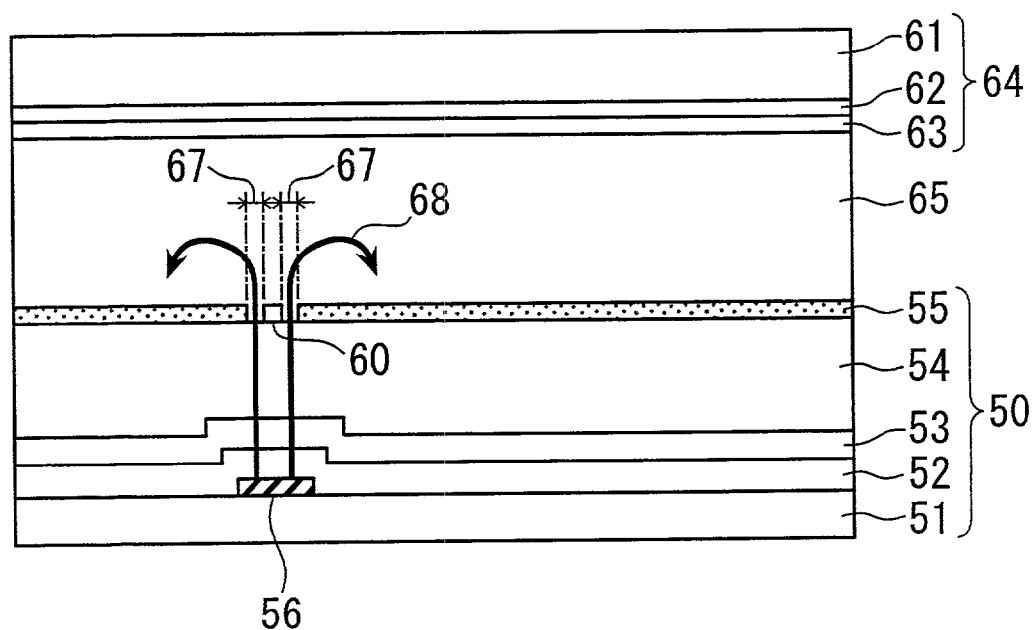
FIG. 10 is a partial cross sectional view taken along the line A—A of FIG. 9.

In this case, when viewed from upside, the control electrode 20 may be formed such that the control electrode 20 at least overlaps the gap 26 in width direction. It is not always necessary to form the control electrode 20 such that the control electrode 20 wholly covers the gate line 16. Even when the control electrode 20 does not cover the gate line 16 completely, if the gap 26 is wholly covered by the control electrode 20, it is possible to avoid occurrence of the lateral leak of electric field 68 like that of the conventional liquid crystal display shown in FIG. 10.

Figure 4:
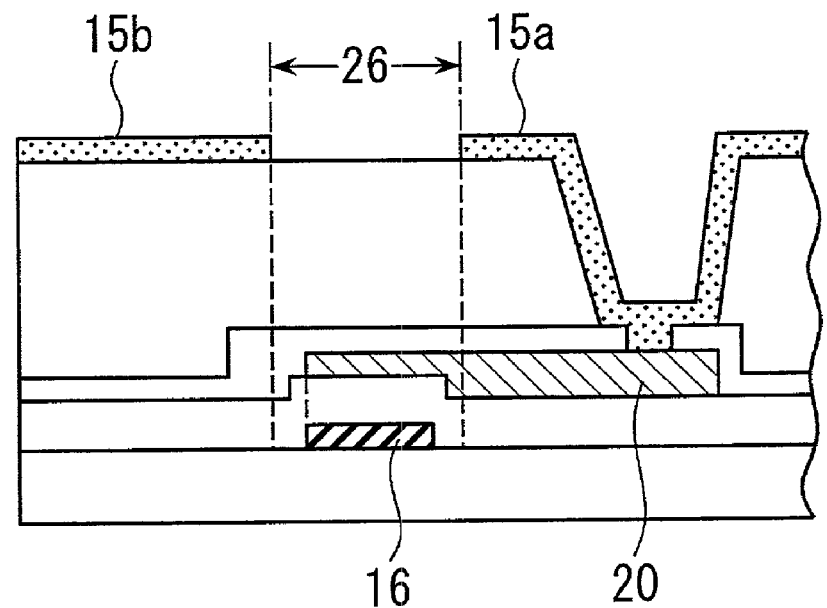
FIG. 4 is a partial cross sectional view showing a second example of a locational relationship among a gate line, a gap between pixel electrodes and a control electrode.

Second, as shown in FIG. 4, the width of the gate line 16 may be smaller than the width of the gap 26, and, when viewed from upside, the gate line 16 may be wholly contained in the gap 26.

In such case, when viewed from upside, the control electrode 20 may be formed such that the control electrode 20 at least overlaps the gate line 16 in width direction. It is not always necessary to form the control electrode 20 such that the control electrode 20 wholly covers the gap 26. Even when the control electrode 20 does not cover the gap 26 completely, if the gate line 16 is wholly covered by the control electrode 20, it is possible to avoid occurrence of the lateral leak of electric field 68 in the conventional liquid crystal display shown in FIG. 10.

Figure 5:
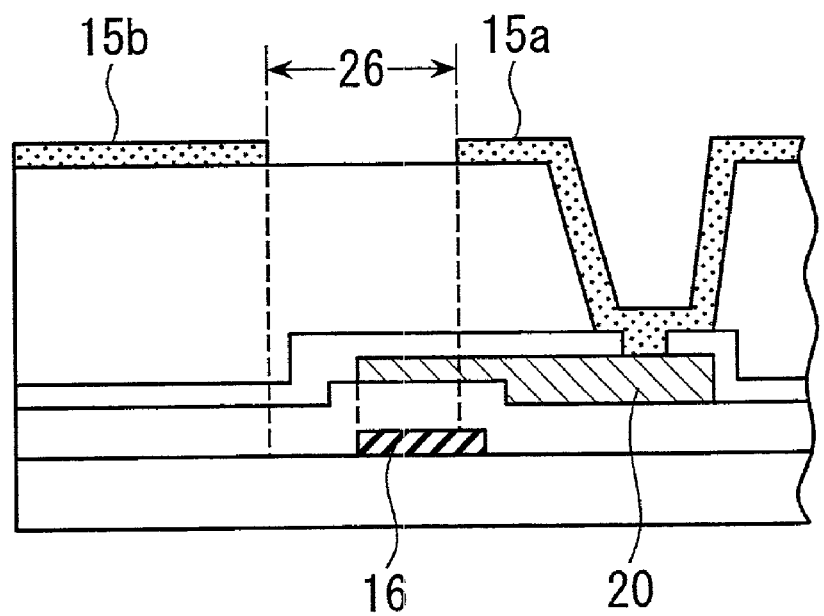
FIG. 5 is a partial cross sectional view showing a third example of a locational relationship among a gate line, a gap between pixel electrodes and a control electrode.

Third, as shown in FIG. 5, when viewed from upside, the gate line 16 may be partially contained in the gap 26, and a gap may exist between the pixel electrode 15b and the gate line 16.

Figure 6:
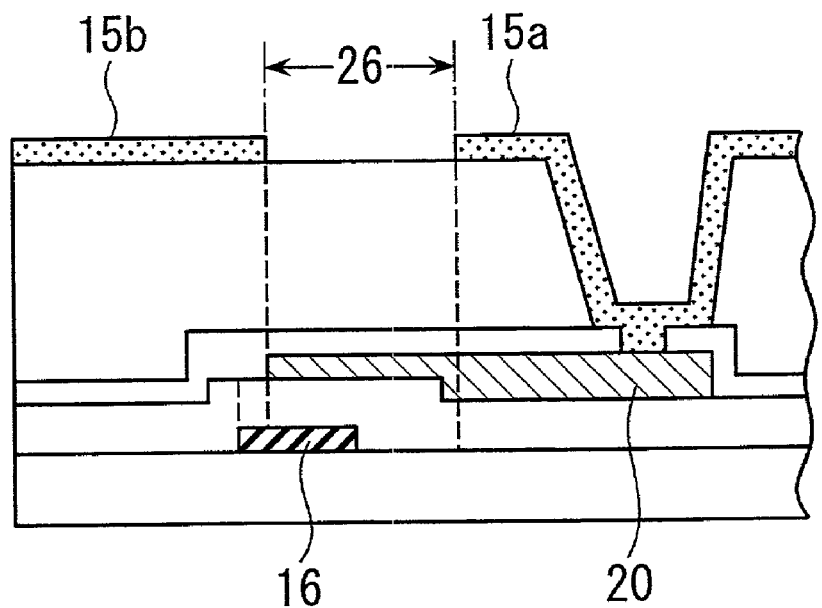
FIG. 6 is a partial cross sectional view showing a fourth example of a locational relationship among a gate line, a gap between pixel electrodes and a control electrode.

Fourth, as shown in FIG. 6, when viewed from upside, the gate line 16 may be partially contained in the gap 26, and a gap may exist between the pixel electrode 15a and the gate line 16.

In these cases, when viewed from upside, the control electrode 20 may be formed such that the control electrode 20 at least overlaps the gate line 16 in width direction or such that the control electrode 20 at least overlaps the gap 26 in width direction. It is not always necessary to form the control electrode 20 such that the control electrode 20 also completely overlaps the gap 26 and the gate line 16, in respective cases. Even when the control electrode 20 does not cover both the gap 26 and the gate line 16 completely, if the gate line 16 or the gap 26 is wholly covered by the control electrode 20 in width direction, it is possible to avoid occurrence of the lateral leak of electric field 68 in the conventional liquid crystal display shown in FIG. 10.

In the above-mentioned first embodiment, the control electrode 20 is formed integrally with the source electrode 18a via the extended portion 18b. However, it is not always necessary to form the control electrode 20 integrally with the source electrode 18a.

It is also possible to form the control electrode 20 and the source electrode 18a separately, without forming the extended portion 18b. In such case, it is possible to form the control electrode 20 and the source electrode 18a on mutually different layers, or to form the control electrode 20 and the source electrode 18a on the same layer. However, by forming the control electrode 20 and the source electrode 18a on the same layer, it is possible to form the control electrode 20 and the source electrode 18a in the same manufacturing process and to simplify the manufacturing process. Therefore, it is preferable that the control electrode 20 and the source electrode 18a are formed on the same layer.

When the control electrode 20 and the source electrode 18a are formed as separate pieces, it is preferable that that the potential of the control electrode 20 and the potential of the source electrode 18a are made equal to each other.

By setting the potential of the control electrode 20 and the potential of the source electrode 18a to the same value, it is possible to decrease the number or kind of potentials to be set, and to simplify a drive circuit of the liquid crystal display according to the present embodiment.

In the liquid crystal display according to the above-mentioned embodiment, the control electrode 20 is made of metal such as chromium and the like. However, it is also possible to form the control electrode 20 by using indium tin oxide (ITO).

It is also possible to form the control electrode 20 as a multi-layer structure which is made of two or more materials selected from a group consisting of chromium, molybdenum, titanium and ITO.

In the above-mentioned embodiment, the liquid crystal display is formed as a liquid crystal display having an organic interlayer film structure. However, the liquid crystal display according to the present invention can be formed as a liquid crystal display having a COT structure, a reflection type liquid crystal display or the like.

Also, in the liquid crystal display according to the present embodiment, the contact hole 19 is formed at a location of the extended portion 18b of the source electrode 18a. However, it is also possible to form the contact hole 19 on the control electrode 20. By forming the contact hole 19 on the control electrode 20, it is possible to improve an aperture ratio by the amount corresponding to the area of the contact hole 19, when compared with the case the contact hole 19 is formed on the extended portion 18b.

There are liquid crystal displays of a type in which a direction of aligned liquid crystal molecules, i.e., a director, is rotated in a plane perpendicular to the substrate to perform display operation, and of a type in which a director is rotated in a plane parallel to the substrate to perform display operation.

A typical example of a liquid crystal display of the former type is a liquid crystal display of TN (Twisted Nematic) mode, and a liquid crystal display of the latter type is called a liquid crystal display of IPS (In-Plane Switching) mode or lateral electric field mode. In the liquid crystal display of IPS mode, a viewer sees the screen of the liquid crystal display only in the direction of short axis of liquid crystal molecules even if he changed a viewpoint. Therefore, viewing angle characteristics do not depend on a rising angle of liquid crystal molecules, so that wider viewing angle characteristics can be attained than those of the liquid crystal display of TN mode.

As the liquid crystal display according to the first embodiment mentioned above, it is possible to select any of the liquid crystal display of TN mode and the liquid crystal display of IPS mode.

The liquid crystal display according to the first embodiment mentioned above and variation thereof can be applied to various electronic equipment. An explanation will now be made on examples of such electronic equipment.

Figure 7:
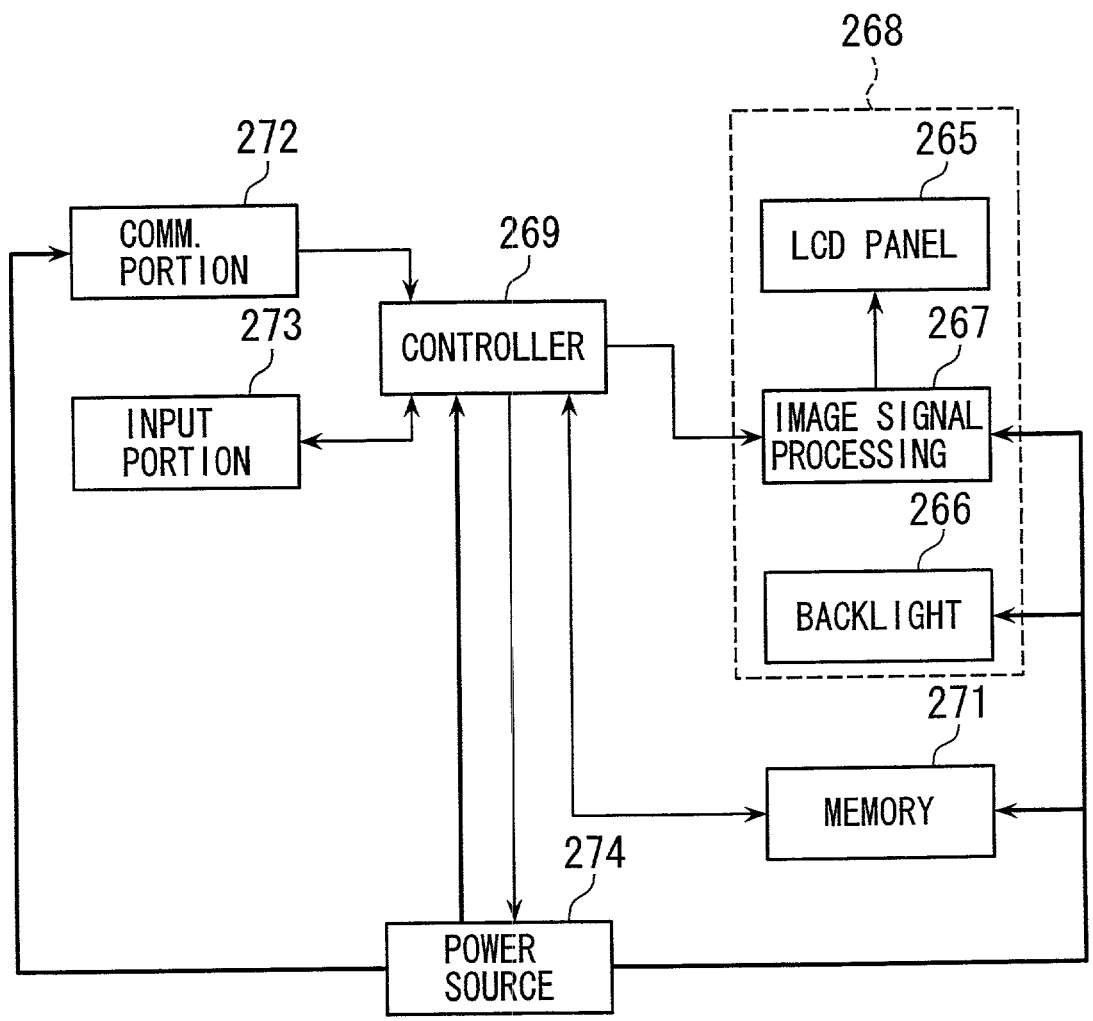
FIG. 7 is a block diagram showing an example of an electronic equipment to which a liquid crystal display according to the present invention is applied.

FIG. 7 is a block diagram of a portable information terminal 250 to which the above-mentioned liquid crystal display according to the first embodiment is applied. The above-mentioned liquid crystal display according to the first embodiment is used as a component of a liquid crystal display panel 265, in this portable information terminal 250.

The portable information terminal 250 according to this example comprises a display portion 268, a control portion 269, a memory portion 271, a communicating circuit portion 272, an input portion 273 and a power source 274. The display portion 268 includes the liquid crystal display panel 265, a back light generating means 266, and an image signal processing portion 267. The image signal processing portion 267 generates various signals required for driving the liquid crystal display panel 265 based on an input signal received from the control portion 269 and the like. The control portion 269 comprises a microprocessor and the like, generates various control signals for components of the portable information terminal 250 and controls an operation thereof. The memory portion 271 stores a program executed by the control portion 269 and various data. The communicating circuit portion 272 performs data communication and the like. The input portion 273 comprises, for example, a key board or a pointer. The power source 274 comprises, for example, a rechargeable battery and supplies electric power to various components of the portable information terminal 250.

By using the liquid crystal display panel 265 which includes the liquid crystal display according to the first embodiment of the present invention, it is possible to improve display quality of various images, characters and the like in the display portion 268.

The liquid crystal display panel 265 which includes the liquid crystal display according to the first embodiment of the present invention can be applied to a display monitor apparatus, for example, of a portable type personal computer, a notebook type personal computer or a desktop type personal computer.

Figure 8:
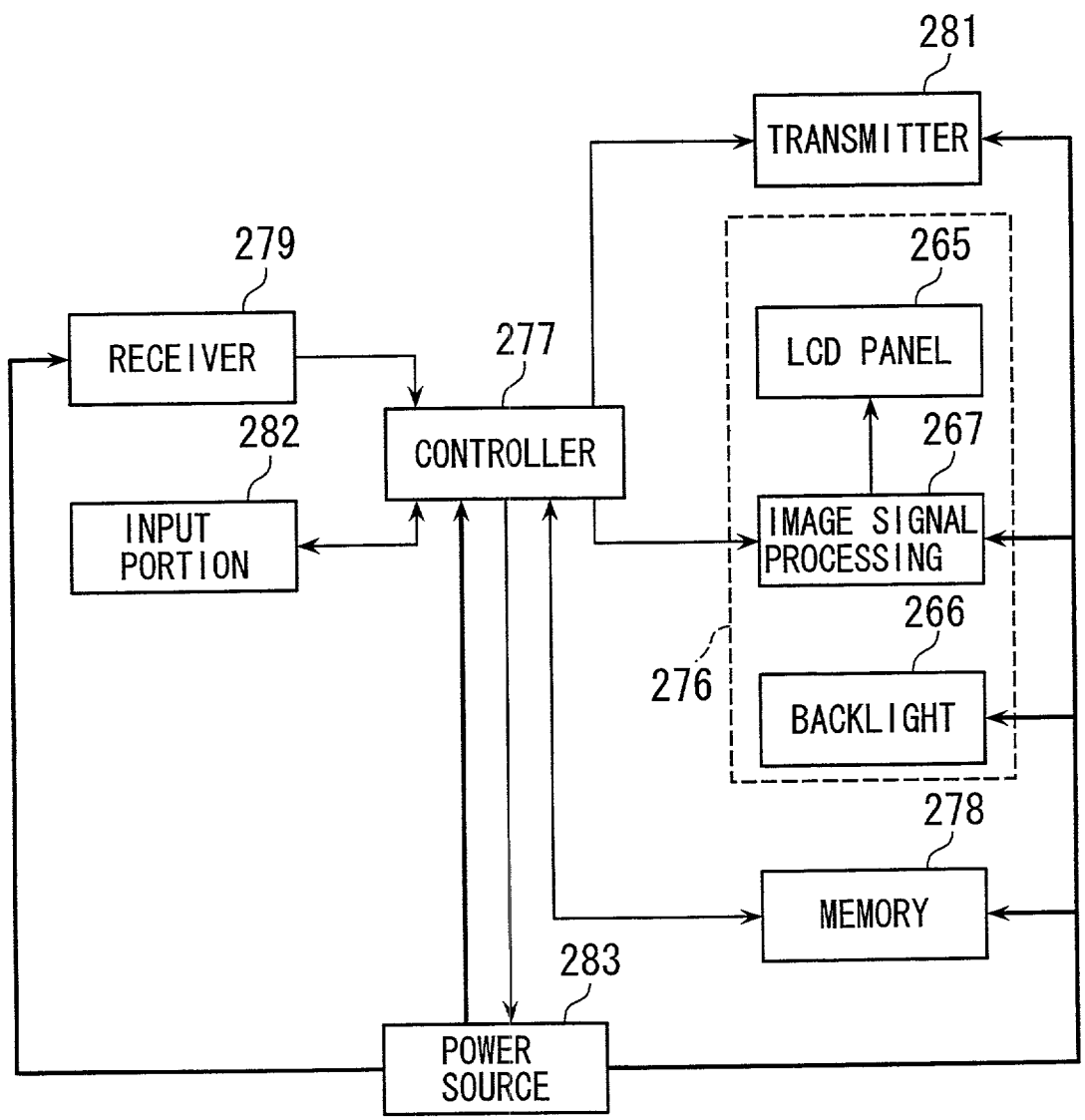
FIG. 8 is a block diagram showing another example of an electronic equipment to which a liquid crystal display according to the present invention is applied.
Figure 9:
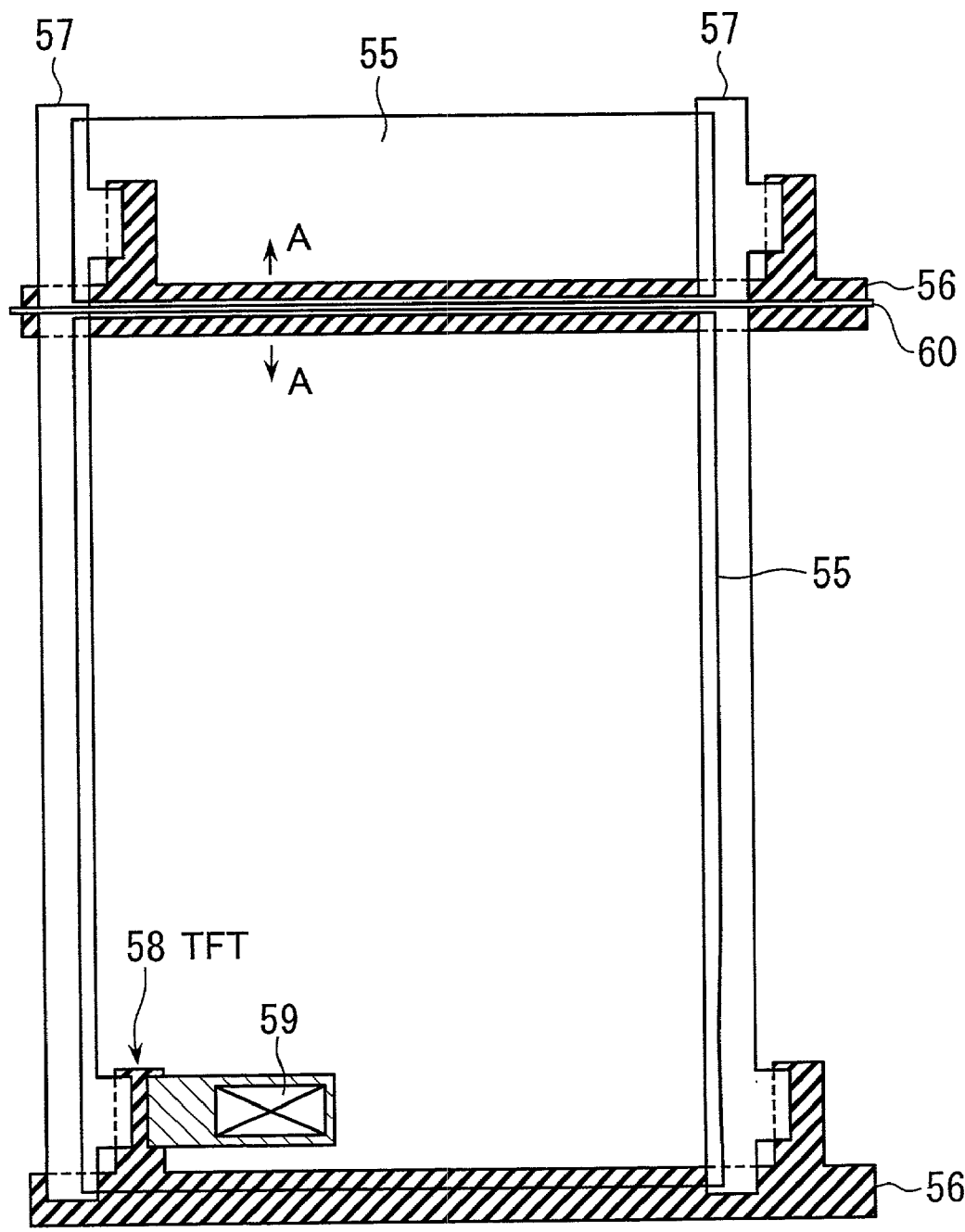
FIG. 9 is a plan view showing a portion of an active matrix substrate in a conventional liquid crystal display.

FIG. 8 is a block diagram of a portable telephone 275 to which the above-mentioned liquid crystal display according to the first embodiment is applied.

The portable telephone 275 according to this example comprises a display portion 276, a control portion 277, a memory portion 278, a receiving circuit portion or receiver 279, a transmitting circuit portion or transmitter 281, an input portion 282 and a power source 283. The display portion 276 includes the liquid crystal display panel 265, a back light generating means 266, and an image signal processing portion 267. The image signal processing portion 267 generates various signals required for driving the liquid crystal display panel 265 based on an input signal received from the control portion 277 and the like. The control portion 277 comprises a microprocessor and the like, generates various control signals for components of the portable telephone 275 and controls an operation thereof. The memory portion 278 stores a program executed by the control portion 277 and various data. The receiving circuit portion 279 receives a radio signal and supplies received information to the control portion 277. The transmitting circuit portion 281 receives information from the control portion 277 and transmits a radio signal. The input portion 282 comprises, for example, a key board or a pointer. The power source 283 comprises, for example, a rechargeable battery and supplies electric power to various components of the portable telephone 275.

By using the liquid crystal display panel 265 which includes the liquid crystal display according to the first embodiment of the present invention, it is possible to improve display quality of various images, characters and the like in the display portion 276.

In the above description, the present invention is explained mainly on the characteristic points thereof, and items known to those of ordinary skill in the art are not explained in detail. However, such items are easily inferred by those of ordinary skill in the art from known technologies.

As mentioned above, in the liquid crystal display according to the present invention, the control electrode is formed such that the control electrode covers at least the gate line 16 in the gap portion between the pixel electrodes. Therefore, the electric field produced by the potential difference between the gate line and the pixel electrodes is completely shielded by the control electrode. That is, a phenomenon in which the electric field leaks through the gap between the pixel electrodes and extends laterally along the pixel electrodes into the liquid crystal layer, i.e., the so-called lateral leak of electric field, can be effectively avoided.

Also, since the pixel electrode and the control electrode are coupled with each other via the contact hole, an auxiliary capacitance is formed between the control electrode and the gate line via the gate insulating film interposed therebetween. Therefore, according to the structure of the present invention, it is possible to increase the storage capacitance of the liquid crystal display.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as falling within the scope of the appended claims.

What is claimed is:

1. A liquid crystal display comprising:
a plurality of gate lines disposed parallel to each other;
a plurality of data lines disposed parallel to each other and perpendicularly to said plurality of gate lines;
plural switching elements each disposed near an intersection between said plurality of gate lines and said plurality of data lines, each switching element having a source and a drain electrode, each said source and drain electrode overlapping one of said plural gate lines in plan view;
a plurality of pixel electrodes disposed over said gate lines and said data lines via an interlayer insulating film, so that in plan view, there is a gap between adjacent pixel electrodes, such that said gap between adjacent pixel electrodes at least partially overlaps with said gate line, an area where said source and drain electrodes overlap with said gate line to form the switching element being entirely outside said gap between adjacent pixel electrodes; and
a plurality of control electrodes each disposed directly under said gap between adjacent pixel electrodes and over said gate line, as seen in plan view, said control electrode directly overlies said gate line, each of said plural control electrodes being an extension of a corresponding source electrode of one of said switching elements and being continuous with said corresponding source electrode.

2. A liquid crystal display as set forth in claim 1, wherein, in plan view, said control electrode at least overlaps with said gap between adjacent pixel electrodes in width direction.

3. A liquid crystal display as set forth in claim 1, wherein, in plan view, said control electrode at least overlaps with an area in which said gate line and said gap between adjacent pixel electrodes overlap.

4. A liquid crystal display as set forth in claim 1, wherein, in plan view, said control electrode overlaps with said gate line and with said gap between adjacent pixel electrodes.

5. A liquid crystal display as set forth in claim 1, wherein said control electrode has the same potential voltage as that of said source electrode of said switching element.

6. A liquid crystal display as set forth in claim 1, wherein said control electrode is formed in the same layer as that of said source electrode of said switching element.

7. A liquid crystal display as set forth in claim 1, wherein said control electrode is formed integrally with said source electrode of said switching element.

8. A liquid crystal display as set forth in claim 1, wherein said control electrode has a single layer structure comprising metal or ITO.

9. A liquid crystal display as set forth in claim 1, wherein said control electrode has a multilayer structure, each layer thereof comprising metal or ITO.

10. A liquid crystal display as set forth in claim 1, wherein said interlayer insulating film comprises an organic film.

11. A liquid crystal display as set forth in claim 1, wherein said liquid crystal display has a COT structure.

12. A liquid crystal display as set forth in claim 1, wherein said liquid crystal display is a reflection type liquid crystal display.

13. A liquid crystal display as set forth in claim 1, wherein said control electrode and said source electrode of said switching element are coupled via an extended portion of said source electrode, and a contact hole for coupling said control electrode and said pixel electrode is provided on said extended portion.

14. A liquid crystal display as set forth in claim 1, wherein a contact hole for coupling said control electrode and said pixel electrode is provided on said control electrode.

15. An electronic equipment which includes said liquid crystal display as set forth in claim 1, in a display portion of said electronic equipment.

16. A liquid crystal display comprising:
an active matrix substrate;
an opposing substrate which is opposed to said active matrix substrate; and
a liquid crystal layer interposed between said active matrix substrate and said opposing substrate;
wherein said active matrix substrate comprises:
a plurality of gate lines which are disposed on an insulating substrate and which are disposed parallel to each other;
a plurality of data lines which are disposed on said plurality of gate lines via a gate insulating film and which are disposed parallel to each other and perpendicularly to said plurality of gate lines;

switching elements each disposed in the proximity of one of intersections between said plurality of gate lines and said plurality of data lines, each switching element having a source and a drain electrode, each said source and drain electrode overlapping one of said plural gate lines in plan view;

a plurality of pixel electrodes disposed over said gate lines and said data lines via an interlayer insulating film, so that in plan view there is a gap between adjacent pixel electrodes, said gap between adjacent pixel electrodes at least partially overlaps with said gate line, an area where said source and drain electrodes overlap with said gate line to form the switching element being entirely outside said gap; and a plurality of control electrodes each disposed directly under said gap between adjacent pixel electrodes and over said gate line, in plan view, said control electrode directly overlies said gate line, said plural control electrodes being entirely within an adjacent two of said data lines.

17. A liquid crystal display as set forth in claim 16, wherein said control electrode is formed integrally with said source electrode of said switching element.

18. A liquid crystal display as set forth in claim 16, wherein said control electrode and said source electrode of said switching element are coupled via an extended portion of said source electrode, and a contact hole for coupling said control electrode and said pixel electrode is provided on said extended portion.

19. A liquid crystal display as set forth in claim 16, wherein a contact hole for coupling said control electrode and said pixel electrode is provided on said control electrode.

20. The liquid crystal display as set forth in claim 7, wherein for each said switching element, the control electrode covers a different said gate line than the gate line that drives the gate of the switching element.

21. The liquid crystal display as claimed in claim 4, wherein said control electrode completely overlaps said gate line in a width direction.

22. A liquid crystal display comprising:

a plurality of gate lines disposed parallel to each other;

a plurality of data lines disposed parallel to each other and perpendicularly to said plural gate lines;

plural switching elements each disposed near an intersection between said plural gate lines and said plural data lines, each switching element having a source and a drain electrode;

a plurality of pixel electrodes disposed over said gate lines and said data lines via an interlayer insulating film, in plan view, there is a gap between adjacent pixel electrodes, each said gap between adjacent pixel electrodes at least partially overlaps with one of said gate lines; and a plurality of control electrodes, each of said plural control electrodes being directly under a first gap between a first set of adjacent pixel electrodes and directly overlying a first gate line, as seen in plan view, and extending from and being continuous with a source of one of the switching elements whose gate is driven by a second gate line outside a second gap between a second set of adjacent pixel electrodes.

* * * * *